Figure 4:
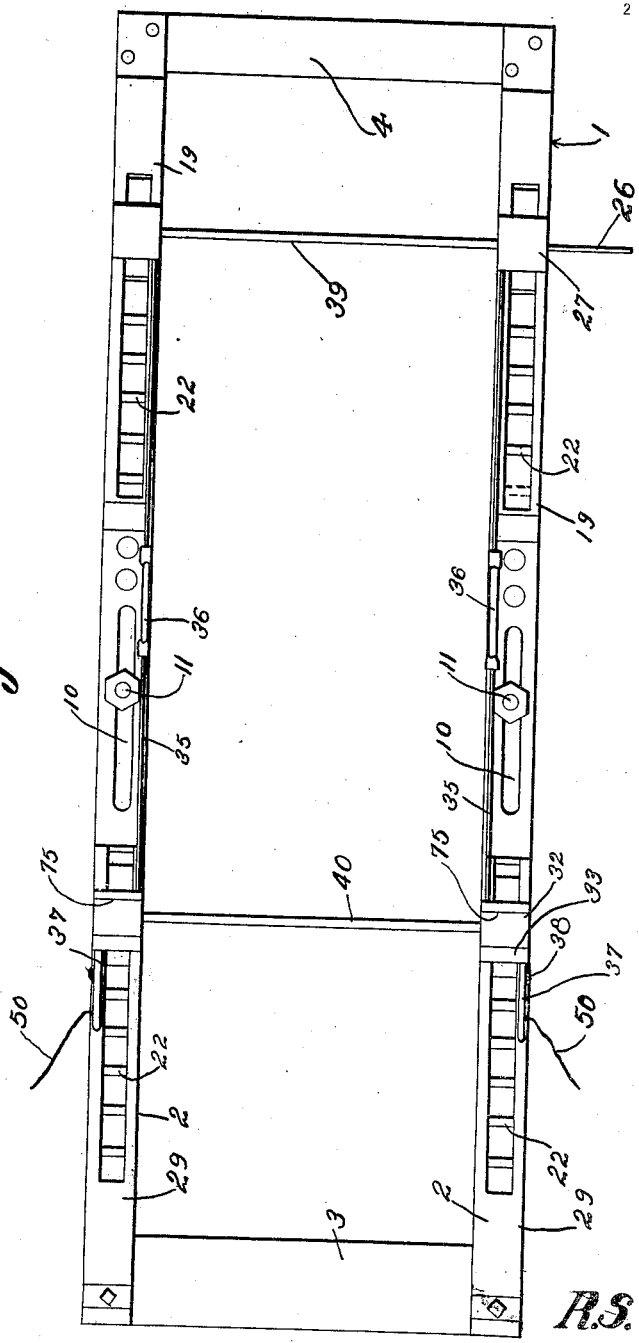

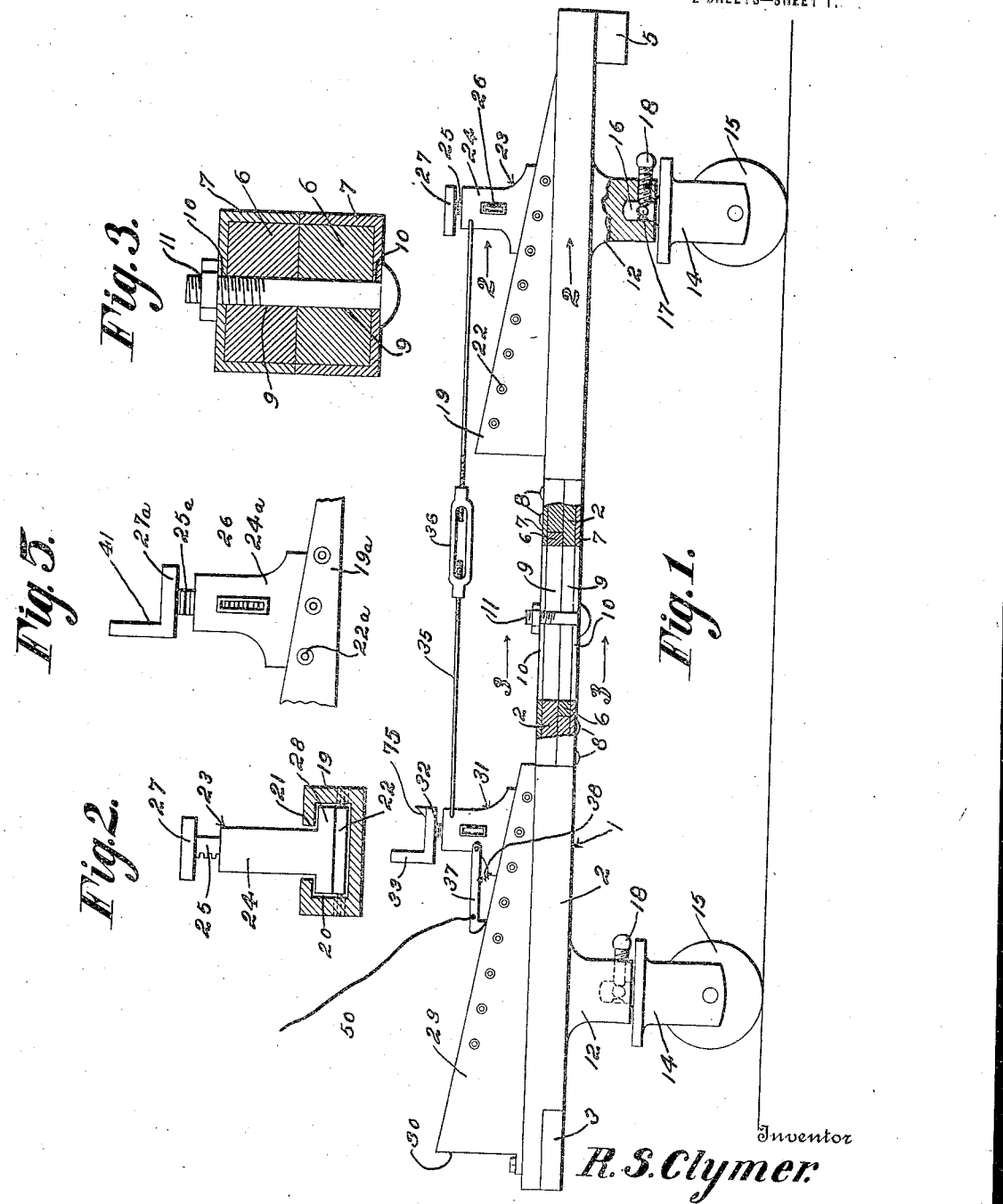

R. S. CLYMER.
AUTOMOBILE TRUCK.
APPLICATION FILED SEPT. 23, 1920.

1,428,681.

Patented Sept. 12, 1922.
2 SHEETS—SHEET 2

Inventor
R.S.Clymer.
By CASnow&Co.
Attorneys

Patented Sept. 12, 1922.

1,428,681

UNITED STATES PATENT OFFICE.

REUBEN S. CLYMER, OF QUAKERTOWN, PENNSYLVANIA.

AUTOMOBILE TRUCK.

Application filed September 23, 1920. Serial No. 412,176.

*To all whom it may concern:*

Be it known that I, REUBEN S. CLYMER, a citizen of the United States, residing at Quakertown, in the county of Bucks and State of Pennsylvania, have invented a new and useful Automobile Truck, of which the following is a specification.

It is the object of this invention to provide novel means whereby an automobile or other machine may be lifted off its wheels, by its inertia, as the automobile enters a garage or approaches any other predetermined place.

Within the scope of what is claimed, a mechanic may make changes in the precise structure shown, without departing from the spirit of the invention.

In the drawings:—Figure 1 shows in side elevation, a device constructed in accordance with the invention; Figure 2 is a cross section taken through one of the tracks; Figure 3 is a cross section showing the overlapped ends of the frame bars; Figure 4 is a top plan; Figure 5 is a side elevation showing a modification in one of the jacks.

In carrying out the invention there is provided a frame 1 which may be constructed variously without jeopardizing the utility of the invention. The frame 1 may include side bars 2 connected by a rear end bar 3 and by a forward end bar 4. It may be desirable to bow the forward end bar 4 down, as shown at 5, to permit the passage of the differential casing, when an automobile approaches the frame 1. The side bars 2 comprise relatively movable parts having overlapped ends 6. Trough-shaped reinforcing members 7 are secured to the parts of the bars as indicated at 8, the trough-shaped member on each part of the bar receiving the end 6 of the other part, to prevent relative lateral movement between the ends 6 of the parts of each bar 2. Elongated slots 9 are fashioned in the ends 6 and register with slots 10 in the reinforcing members 7. Clamping devices 11, which may be bolts, are located in the slots 9 and 10. When the clamping devices 11 are loosened, the frame 1 may be lengthened or shortened to accommodate vehicles of different sizes and makes.

Sockets 12 depend from the side bars 2. Caster frames 14 are provided, wheels 15 being journaled therein. The caster frames 14 have stems 16 rotatable in the sockets 12, the stems being provided with side seats 17 adapted to receive the inner ends of set screws 18 threaded into the sockets.

Inclined tracks 19 are mounted on the forward portions of the side bars 2 and have longitudinal passages 20, there being reduced slots 21 in the tops of the tracks, the slots communicating with the passages, thus forming T-shaped guideways. Rollers 22 are journaled at their ends in the tracks 19 and extend across the passages 20. Supports 23 are movable along the tracks 19. The supports 23 are in the form of jacks, including a base 24 and a movable member 25 having a head 27. The member 25 may be in the form of a rack adapted to be operated by a detachable handle 26, although the support 23 may embody a jack of any kind. The base 24 includes a laterally extended foot 28 movable in the passage 20, over the rollers 22, the base proper moving in the slot 21. The rollers 22 of course facilitate the movement of the supports 23 with respect to the tracks 19.

Rear tracks 29 are provided, these tracks being constructed like the tracks 19, the rear ends 30 of the tracks constituting keepers to be engaged by holding latches, as will be explained hereinafter. Supports 31 traverse the tracks 29, the supports being constructed like the supports 23, aside from the fact that the heads 32 have upstanding projections 33. The base portions of the supports 31 and 23 are united by a longitudinally adjustable connection which may include rods 35 and a turn buckle 36. Latches 37 are pivoted to the base portions of the rear supports 31 and are adapted to slide along the tracks 29, retractile springs 38 connecting the latches with the base portions of the supports 31 and serving to assure an engagement between the latches 37 and the keepers 30 at the ends of the tracks 9, when the supports 31 have been thrust rearwardly by the action of the automobile. The body portions 24 of the supports 23 may be connected by a tie rod 39, a tie rod 40 bearing a like relation to the supports 31.

In practical operation, the caster frames 14 are rotated until the wheels 15 are disposed at right angles to the length of the frame 1, the wheels being held in the aforesaid position by advancing the set screws 18 until the inner ends of the screws are received in the appropriate ones of the seats 17. The frame cannot move longitudinally, when the wheels 15 are arranged as above described, it being desirable that the frame shall not advance appreciably when the automobile or other vehicle approaches the frame. The automobile advances, and the front axle engages the projections 33 of the supports 31, the supports moving upwardly along the tracks 29. Motion is transmitted from the supports 21 to the supports 23 by the rods 35 and the turnbuckles 36, the supports 23 advancing along the tracks 19. The supports 23 will rise under the rear axle casing of the vehicle, the supports 31 rising under the forward axle. In this way, the vehicle will be elevated, automatically, and the weight will be taken off the tires of the vehicle. The latches 37 engage with the keepers 30, as the supports 31 advance, and, thus, the supports 31 and 23 will be prevented from sliding backwardly down the tracks and lowering the vehicle.

See Figure 5. The connection 35—36 may be dispensed with, but under such circumstances it will be necessary to provide the head 27 of each support 23 with a projection 41 adapted to engage the rear axle casing. In Figure 5, parts hereinbefore described have been designated by numerals previously used, with the suffix "a."

The set screws 18 may be backed out of engagement with the stems 16 of the caster frames 14, and then the stems can rotate in the sockets 12, the wheels 15 assuming any desired angle with respect to the length of the frame 1 and permitting the frame and the vehicle thereon to be trundled in any lateral direction. Further, the jacks or supports 23 and 31 may be pumped up or let down, thereby permitting the vehicle which is carried by the jacks or supports to be raised or lowered.

An operating means of any kind, such as flexible elements 50, are connected to the latches 37. When it is desired to lower the vehicle to the ground, the latches 37 may be disengaged from the keepers 30 by drawing upon the flexible elements 50, whereupon the supports 31 and 23 will slide backwardly and downwardly along the tracks 29 and 19.

The heads 32 of the supports 31 may be provided with latches 75, of any desired kind, the latches being in the form of fixed lugs if preferred. When the vehicle advances, the forward axle passes over the parts 75 and engages the projections 33, the supports 31 being advanced along the tracks 29. The supports rise beneath the axle, as they are advanced, and the parts 75 engage behind the axle and render it impossible for the axle to slide rearwardly off the heads 32. When the supports 31 move downwardly along the tracks 29, the parts 75 are depressed enough so that the axle can move rearwardly, over them, after the wheels of the vehicle have come into contact with the ground.

I claim:—

1. In a device of the class described, a frame comprising parts which are relatively adjustable with respect to each other to alter the length of the same; means for holding said parts in adjusted positions with respect to each other; anti-friction devices fixed on the frame for rotation and located in parallel planes inclined with respect to the horizontal; lifting jacks mounted to travel on the anti-friction devices, each jack comprising parts connected for relative vertical movement, and means under the control of an operator for producing relative lifting movement between the parts of the jack; a longitudinally adjustable connection between the jacks; a latch pivotally mounted with respect to one jack and cooperating with a portion of the frame to hold the jacks against downward sliding movement on the anti-friction devices; and means for operating the latch from a remote point.

2. In a device of the class described, a frame; an inclined track thereon; a support slidable on the track and adapted to be advanced by the thrust of a vehicle; wheels; means for mounting the wheels on the frame for adjustment with respect to a vertical axis, whereby the wheels may be disposed transversely of the frame, thereby to resist the thrust of the vehicle and means under the control of an operator for holding the wheels in adjusted positions with respect to a vertical axis.

In testimony that I claim the foregoing as my own, I have hereto affixed my signature in the presence of two witnesses.

REUBEN S. CLYMER.

Witnesses:
IRVIN M. CONWAY,
JOHN DONOVAN.